United States Patent [19]

Yoshiwara

[11] Patent Number: 4,457,524
[45] Date of Patent: Jul. 3, 1984

[54] MOTORCYCLE SEAT

[75] Inventor: Tomomasa Yoshiwara, Fukuroi, Japan

[73] Assignee: Yamaha Hatsudoki Kabushiki Kaisha, Iwata, Japan

[21] Appl. No.: 254,744

[22] Filed: Apr. 16, 1981

[30] Foreign Application Priority Data

Apr. 18, 1980 [JP] Japan .................................. 55-51999

[51] Int. Cl.³ ........................ B62K 11/04; B62K 19/30
[52] U.S. Cl. ..................................... 280/5 A; 180/219; 297/197
[58] Field of Search .......... 280/5 A, 5 R, 202, 289 A, 280/289 R; 180/219, 225; 297/195, 214, 243, 444

[56] References Cited

U.S. PATENT DOCUMENTS

| 2,330,341 | 9/1943 | DuPont et al. | 180/219 |
| 3,008,764 | 11/1961 | Pile | 297/444 |
| 3,037,814 | 6/1962 | Gardner et al. | 297/444 |
| 4,059,207 | 11/1977 | Jackson et al. | 280/289 A |
| 4,280,582 | 7/1981 | Kouyama et al. | 180/219 |

FOREIGN PATENT DOCUMENTS 2405860 6/1979 France .............................. 180/219

Primary Examiner—Joseph F. Peters, Jr.
Assistant Examiner—Donn McGiehan
Attorney, Agent, or Firm—Donald D. Mon

[57] ABSTRACT

The upper surface of a motorcross-type motorcycle fuel tank is recessed. The front end of a motorcycle seat extends into and is seated in this recess and extends for a substantial distance rearwardly of the tank.

6 Claims, 6 Drawing Figures

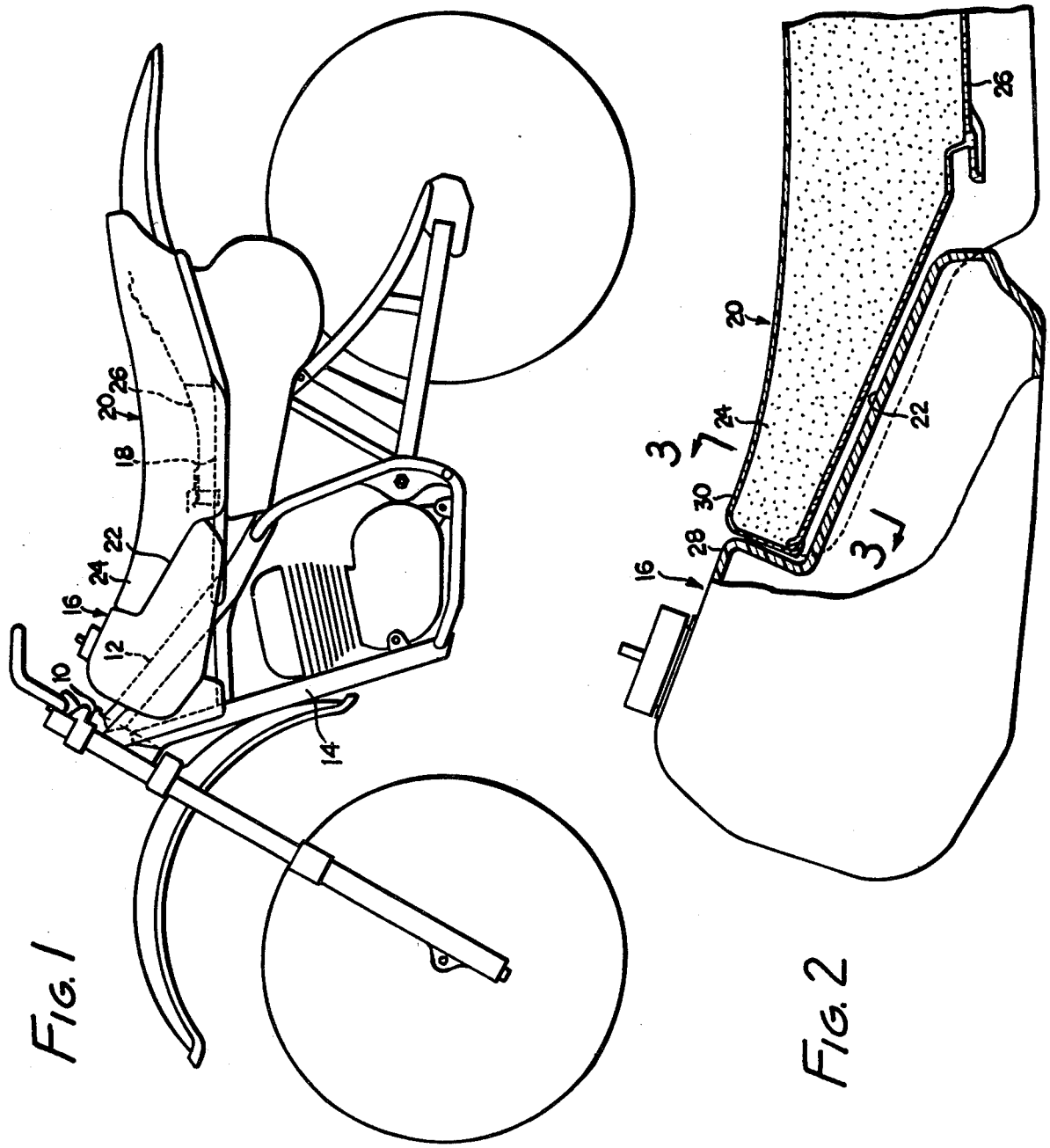

MOTORCYCLE SEAT

FIELD OF THE INVENTION

The present invention relates to a seat for a motocross motorcycle.

BACKGROUND OF THE INVENTION

Since a motocross motorcycle is used to run on very rugged surfaces, the rider is required to assume various riding positions on the seat of the motorcycle. It is therefore preferred that the vehicular seat is made as long as possible. Since, however, the front end of the vehicular seat of a conventional motocross motorcycle is blocked by a fuel tank, the conventional motocross motorcycle has the defect that a sufficiently long seat in front cannot be provided, and the riding positions which the rider can assume are accordingly restricted.

The present invention has been conceived to eliminate the aforementioned defect. It is, therefore, an object of this present invention to provide a seat for a motorcycle which has its leading end protruding to allow the rider to assume various riding positions, many of which are not attainable with conventional seat constructions.

BRIEF DESCRIPTION OF THE INVENTION

According to the present invention, a fuel tank has its upper surface partially formed with a recess, and a seat has its front end extending into and seated in the recess. The leading end of the seat can thereby be extended, and the seat extends rearwardly for a substantial distance from the tank, so that the rider can take various riding positions.

The above and other features of the invention will be fully understood from the following detailed description and the accompanying drawings, in which:

BRIEF DESCRIPTION OF THE DRAWINGS

FIG. 1 is a side elevation schematically showing the construction of a motocross motorcycle to which the embodiments of the present invention are applied;

FIG. 2 is a partially sectional view showing the essential portion of the embodiments according to the present invention;

DETAILED DESCRIPTION OF THE INVENTION

Figure 3:
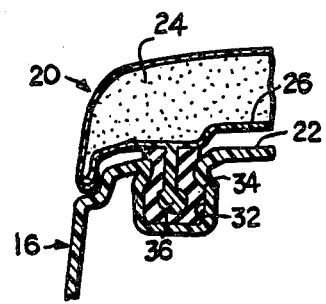
FIG. 3 is a partially sectional view taken along line III—III in FIG. 2.

The preferred embodiments of a seat for a motorcycle according to the present invention will be described with reference to FIGS. 1-3.

FIG. 1 is a side elevation schematically showing the construction of a motocross motorcycle to which the embodiments of the present invention are applied. As shown in FIG. 1, there are attached to a head pipe 10, a tank rail 12 and a down tube 14 which are made to extend backwardly. A fuel tank 16 is arranged above tank rail 12. To a mid-portion of tank rail 12, there is attached a seat rail 18 which is arranged substantially horizontally and extends backwardly of the vehicle. A seat 20 is arranged on seat rail 18. The upper portion of fuel tank 16 is formed with a recess 22, in which a leading end portion 24 of seat 20 is held.

Fuel tank 16 is made of a synthetic resin so that recess 22 is integrally formed when the fuel tank 16 is molded. Recess 22 is positioned in the vicinity of the rear end portion of the upper surface of the fuel tank 16. To the bottom of the seat 20, on the other hand, there is attached a seat bottom 26 (see FIGS. 2 and 3) made of a synthetic resin, through which the seat 20 is arranged on seat rail 18 extending for a substantial distance rearwardly of the tank. The forwardly extending leading end portion 24 of seat 20 is positioned, as shown in FIG. 2, in recess 22 of fuel tank 16 such that the surface 28 of fuel tank 16 and the surface 30 of leading end portion 24 are held substantially at the same level, thereby to form no step between fuel tank surface 28 and seat surface 30.

The attaching construction of the leading end portion 24 of the seat 20 to the fuel tank 16 is shown in FIG. 3. As shown in FIG. 3, fuel tank 16 is formed with a plurality of sockets 32 (although only one of them is shown in FIG. 3), in which rubber members 34 acting as shock-absorbing members are received. In these rubber members 34, moreover, there are fitted protrusions 36 which are made integral with the seat bottom 26. Those protrusions 36 have their leading end portions formed into a ball shape so that they may not easily come out of the rubber members 34 mounted in fuel tank 16. In the manner thus far described, the leading end portion 24 of the seat 20 is fixed on the fuel tank 16.

According to the embodiment having the construction thus far described, because leading end portion 24 of seat 20 is elongated and seated on recess 22 of fuel tank 16, the length of seat 20 is so elongated that the driver of the vehicle can take various riding positions on seat 20. Also, because leading end portion 24 of seat 20 is positioned in recess 22 of fuel tank 16, it is gently curved so that the driver will find no difficulty in taking his selected riding position on leading end portion 24 of seat 20. On the other hand, the driver can shift his riding position from the back to the front on the seat 20.

Figure 4:
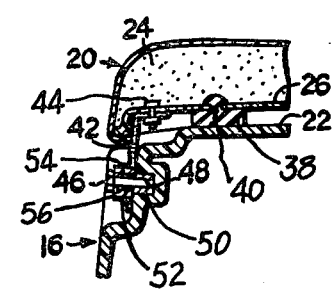
FIGS. 4 to 6 are partially sectional views showing the constructions of three other embodiments according to the present invention.
Figure 5:
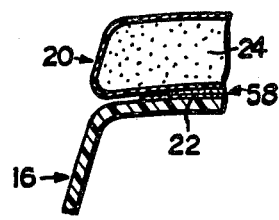
Figure 6:
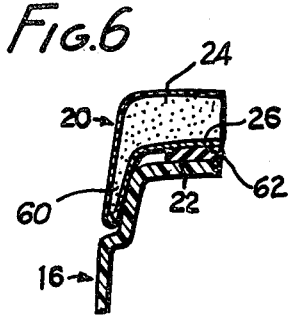

Other embodiments of the attaching construction for leading end portion 24 of seat 20 to fuel tank 16 are shown in FIGS. 4 to 6. According to the embodiment shown in FIG. 4, between seat bottom 26 and recess 22 of fuel tank 16, there are arranged at both right and left sides rubber elements 38 (although only one of them is shown), which act as shock-absorbing members between seat bottom 26 and recess 22. Incidentally, rubber members 38 are fixed in holes 40 which are formed in the seat bottom 26, so that portions of them are fitted therein. A stay 42 having an L-shaped section is attached to the side of fuel tank 16. Stay 42 has its upper portion fixed to seat bottom 26 by means of bolts 44 and has its lower portion formed with holes, in which rubber members 54 are fitted so that it is fixed to the side of the fuel tank 16 by means of bolts 46. Fuel tank 16 has holes 48 in its side, in which there are embedded nuts 50 in which the bolts 46 are screwed. Bolts 46 pass through collars 52, the rubber members 54 and washers 56. Transverse displacement of leading end portion 24 of the seat 20 is prevented by stay 42.

According to the embodiment shown in FIG. 5, leading end portion 24 of seat 20 and recess 22 of fuel tank 16 are retained by means of a pair of detachable retaining tapes (which have their facing surfaces implanted with a number of fibers made of a synthetic resin with their leading ends formed into hooked shapes so that they are retained one to the other by engagements between the free ends of the opposed hairs) 58. If the leading end portion 24 of the seat 20 and the recess 22 of the fuel tank 16 are attached by means of those retaining tapes 58, the resultant effect is that the attachment and detachment of the seat 20 can be facilitated.

According to the embodiment shown in FIG. 6, seat bottom 26 is made to depend from both sides of leading end portion 24 of seat 20 thereby to form depending portions 60, which are fitted in the sides of recess 22 of fuel tank 16 thereby to block the transverse movements of seat 20. Vertical displacements of seat 20 are absorbed by the actions of rubber elements 62 acting as shock-absorbing members.

As has been described hereinbefore, according to the seat for the motorcycle of the present invention, the fuel tank has its upper surface partially formed with the recess, and the seat has its front end extending and seated in the recess. As a result, the seat is substantially elongated so that the rider can take various riding positions.

This invention is not to be limited by the embodiments shown in the drawings and described in the description, which are given by way of example and not of limitation, but only in accordance with the scope of the appended claims.

I claim:

1. A seat construction for a motorcycle of the type having a frame with a head pipe, a tank rail and a seat rail joined to from a supporting structure, a fuel tank mounted to said tank rail having a upper surface, and a seat with a rearwardly-extending rear end, said rear end being mounted to said seat rail, characterized in that: said upper surface of said tank is formed with an upwardly and rearwardly facing recess with a substantial length forward of the rear end of the tank, said seat includes a forwardly projecting front end extending into and seated in said recess, with its top at about the same level as the top of said tank so as to form no appreciable step, said rear end projecting a substantial distance rearwardly of said tank, and attachment means disposed between said seat and said tank to retain said seat to said tank.

2. A seat construction according to claim 1 in which said attachment means comprises sockets in said upper surface of said tank and protrusions depending from said seat and held in said sockets.

3. A seat construction according to claim 2 in which resilient means is seated in said sockets to receive and retain said protrusions.

4. A seat construction according to claim 1 in which said attachment means includes retention tape attached to both said seat and to said fuel tank to hold the seat to the fuel tank.

5. A seat construction according to claim 4 in which said tapes are faced with releasable mutually engaging fibers.

6. A seat construction according to claim 1 in which said attachment means comprises a stay which is fastened to said seat and to said fuel tank, a cushioning element being placed between said seat and said fuel tank.

* * * * *